UNITED STATES PATENT OFFICE.

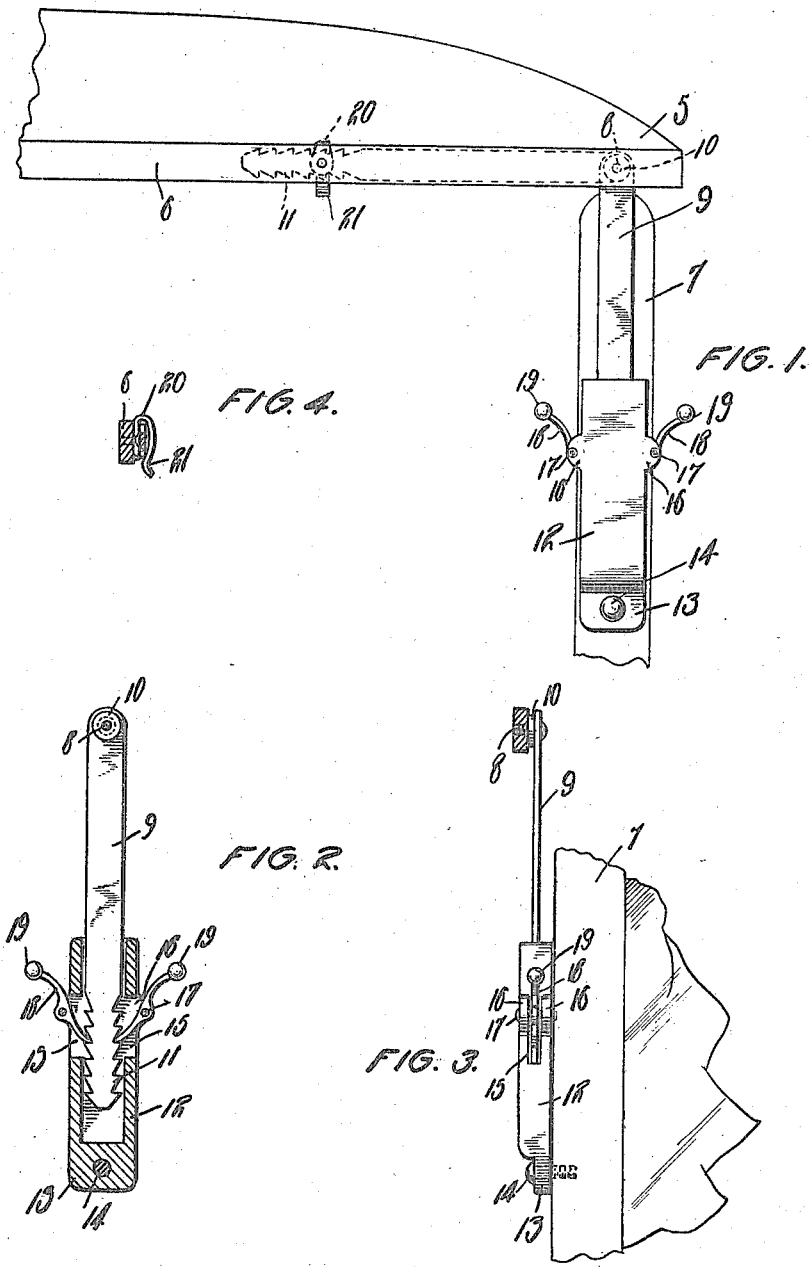

JOHN L. WORKMAN, OF LOAMI, ILLINOIS.

ADJUSTABLE STAY-STRAP.

1,263,504.                    Specification of Letters Patent.         Patented Apr. 23, 1918.

Application filed May 12, 1917. Serial No. 168,214.

*To all whom it may concern:*

Be it known that I, JOHN L. WORKMAN, a citizen of the United States, residing at Loami, in the county of Sangamon and State of Illinois, have invented certain new and useful Improvements in Adjustable Stay-Straps, of which the following is a specification.

My invention relates to stay straps for retaining collapsible tops of vehicles in extended position.

The principal object of the invention resides in the provision of a stay strap of this character which is adjustable and which will dispense with buckles, snap hooks, etc., now commonly used upon stay straps universally used.

A further object of the invention is to provide an adjustable stay strap which will positively retain the vehicle top against vertical movement.

Another object resides in the provision of a stay strap which may be used in conjunction with any type of vehicle embodying a collapsible top without changing the construction of the same, and which when in inoperative position will be out of the way and hidden from view.

It is a further object of my invention to provide an adjustable stay strap particularly adapted to automobile tops which may be readily engaged and disengaged from the stationary part of the vehicle and which consists of few parts which may be readily assembled and disassembled, and which may be manufactured and placed on the market at a comparatively low cost.

Other objects and advantages will be fully apparent from the following description and accompanying drawing wherein one embodiment of the invention is described and illustrated.

The invention embodies constructions, combinations, arrangement and details to be hereinafter specifically referred to, explicitly defined in the appended claims and illustrated in the accompanying drawing wherein Figure 1 is a side elevation of a part of an automobile top and the wind shield of the same, and my improved stay strap applied thereto; the strap proper being shown in dotted lines in inoperative position, Fig. 2 is a view of the stay strap, partly in elevation, Fig. 3 is a view taken at right angles to Fig. 1, the frame of the automobile top being shown in section, and Fig. 4 is a detailed view illustrating the latch for retaining the strap proper in inoperative position, the strap proper and the frame of the automobile top being shown in section.

On a drawing wherein like characters of reference designate like parts in all the views the numeral 5 designates a collapsible automobile or other vehicle top and includes the frame 6. The wind shield of an automobile is shown for the purpose of illustrating the invention and is designated by the numeral 7.

Mounted on a pivot 8 which extends transversely through the frame 6 and capable of pivotal movement thereon is a stay strap 9. The fastening 8 is disposed so that its head projects from the inner face of the frame 6 and the strap 9 is accommodated between this head and a washer 10 which bears against the frame 6. This strap 9 is formed of metal such as light steel and is of uniform width and thickness. The longitudinal edges are formed with teeth or serrations 11. These teeth or serrations may extend for any desired distance on this strap.

Mounted on one of the vertical edges of the wind shield 7 is a casing 12 adapted to receive the stay strap 9, and has its upper end open while the lower end thereof is closed. This casing is formed with a securing flange 13 at its lower end thereof which is secured to the wind shield 7 by a fastening 14. Formed in the casing 12 are openings 15 which are in transverse alinement. Formed at the longitudinal edges of the casing 12 and upon opposite sides of the openings 13 are parallel ears 16.

Mounted in each pair of the parallel ears 16 through the medium of a pivot 17 are pawls or dogs 18, which are adapted to be engaged with the teeth 11 on the strap 9 to retain the strap in position in the casing 12. Each of these pawls or dogs 18 is formed with a weighted enlargement 19, the function of which is to normally retain the dogs in engagement with the teeth or serrations 11 on the strap 9, and are adapted to be grasped by the fingers of the operator for disengaging these pawls from these teeth or serrations.

Mounted on the frame 6 at a point rearwardly of the pivot 8 is a resilient latch 20 which is substantially inverted U-shaped and is formed with a finger engaging tab 21. This latch 20 is adapted to embrace the strap 9 to retain the same in horizontal or inoperative position as clearly illustrated in the dotted line position in Fig. 1 and the detailed view Fig. 4.

In order to retain the vehicle top in extended position the stay strap 9 is disengaged from the latch 20 and inserted in the casing 12, and the teeth 11 on this strap engaged with the pawls 18. When it is desired to disengage the strap 9 from the casing the pawls 18 are simply moved toward each other. Owing to the adjustability of my improved stay strap it will be seen that the same can be conveniently used with vehicle tops of different heights.

It will be understood that one of my improved strap is employed for each side of the vehicle top and that the device can be used in place of the guy strap at the rear of the top.

I wish to here state that it is not only my idea to use these straps upon automobile tops but they may be used equally as well upon other vehicles having movable tops. However when the device is used on vehicles other than automobiles the casing 12 is attached to some stationary part of the vehicle.

While this form of the invention is now deemed the preferred embodiment thereof, I wish it known that the invention may be embodied in constructions other than the one herein specified and that I reserve the right to make such changes and modifications that may be fairly embodied in the scope of the subjoined claims.

What is claimed is:

1. The combination with a foldable vehicle top and a stationary support, of a casing mounted on said support, a vertically swinging bar secured to said top and adapted to be disposed in said casing, teeth formed on said bar, latches carried by said casing and engageable with said teeth, and weights formed on one end of said latches to retain the opposite ends thereof engaged with said teeth.

2. The combination with a foldable top of an independently supported casing, a vertically swinging bar pivoted at one end to said top and adapted at times to have its opposite end disposed in said casing, teeth formed on said bar, latch members pivotally mounted in the casing and having their lower ends engaging said teeth, and weights formed on the upper end of said latch members to normally hold said lower ends in engagement with the teeth.

In testimony whereof I affix my signature in presence of two witnesses.

JOHN L. WORKMAN.

Witnesses:
FRED A. HORN,
H. H. RATHBUN.

Copies of this patent may be obtained for five cents each, by addressing the "Commissioner of Patents, Washington, D. C."